(12) United States Patent
Greminger et al.

(10) Patent No.: US 8,304,492 B2
(45) Date of Patent: Nov. 6, 2012

(54) PROCESS FOR BROMINATING BUTADIENE/VINYL AROMATIC COPOLYMERS

(75) Inventors: Douglas C. Greminger, Midland, MI (US); Ronald B. Leng, Midland, MI (US); William G. Stobby, Midland, MI (US); Shari I. Kram, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 163 days.

(21) Appl. No.: 12/920,839

(22) PCT Filed: Apr. 3, 2009

(86) PCT No.: PCT/US2009/039461
§ 371 (c)(1),
(2), (4) Date: Nov. 10, 2010

(87) PCT Pub. No.: WO2009/126531
PCT Pub. Date: Oct. 15, 2009

(65) Prior Publication Data
US 2011/0060104 A1    Mar. 10, 2011

Related U.S. Application Data

(60) Provisional application No. 61/042,915, filed on Apr. 7, 2008, provisional application No. 61/109,350, filed on Oct. 29, 2008.

(51) Int. Cl.
*C08C 19/12* (2006.01)
*C08F 8/18* (2006.01)

(52) U.S. Cl. .................. 525/54; 525/332.3; 525/378

(58) Field of Classification Search ............. 525/54, 525/332.3, 378
See application file for complete search history.

(56) References Cited

U.S. PATENT DOCUMENTS

| | | | |
|---|---|---|---|
| 5,677,390 A | 10/1997 | Dadgar | |
| 5,686,358 A | 11/1997 | Choi | |
| 5,767,203 A | 6/1998 | Ao et al. | |
| 6,232,393 B1 | 5/2001 | Dadgar | |
| 6,232,408 B1 | 5/2001 | Dadgar | |
| 6,235,831 B1 | 5/2001 | Reed | |
| 6,235,844 B1 | 5/2001 | Dadgar | |
| 2008/0287559 A1 | 11/2008 | King | |
| 2010/0004402 A1 | 1/2010 | King | |

FOREIGN PATENT DOCUMENTS

| | | |
|---|---|---|
| DE | 33801 B | 11/1964 |
| EP | 359269 A | 3/1990 |
| GB | 383154 A | 11/1932 |
| WO | 99/55770 A | 11/1999 |
| WO | 2007/058736 A | 5/2007 |
| WO | 2008/021417 A | 2/2008 |
| WO | WO 2008/021417 A2 * | 2/2008 |

OTHER PUBLICATIONS

Buckles et al, "Spectrophotometric Study of Tetrabutylammonium Tribromide", Oct. 1951.
Conte et al., Mimicking the vanadium Bromoperoxidases Reactions . . . , Tetrahedron Letters 35, 7429-7432 (1994).
Avramoff et al., "The Brominating Properties of Tetrametylammonium Tribromide", 1963.
Collado et al., "Nucleophilic 1,2 Addition of Bromine to Electron deficient double bonds by perbromide reagents", Tetrahedron 50, 6433-6440 (1994).
Muathen, "1,8 diazabicyclo[5.4.0]undec-7-ene hydrobromide perbromide . . .", J. Org. Chem. 1992, 57, 2740-2741.
Bora et al., "Regioselctive Bromination of Organic Substrates . . .", Org. Letters. 2000, 2, 247-249.
Buzdugan et al., "Bromination of Some Styrene-Diene Block Copolymers", Eur. Polym. J. 33, 1713-1716 (1997).

* cited by examiner

*Primary Examiner* — Roberto Rabago
(74) *Attorney, Agent, or Firm* — Gary C Cohn PLLC (57) ABSTRACT

A polybutadiene brominating method uses a quaternary ammonium tribromide as the brominating agent. The brominating is performed in solution, and dual extractions recover the spent brominating agent and recombine it with fresh bromine to regenerate an active tribromide. Solvent and aqueous extraction streams can be purified and recycled as needed.

15 Claims, 1 Drawing Sheet

PROCESS FOR BROMINATING BUTADIENE/VINYL AROMATIC COPOLYMERS

This application claims benefit of U.S. Provisional Patent Application Nos. 61/042,915, filed 7 Apr. 2008, and 61/109,350, filed 29 Oct. 2008.

The present invention relates to a process for brominating a butadiene copolymer such as a block, random or graft copolymer of styrene and butadiene.

WO 2008/021417 describes a process for brominating a butadiene copolymer. The brominating agent is a phenyltrialkylammonium tribromide, benzyltrialkylammonium tribromide or tetraalkylammonium tribromide. The process is conducted with the copolymer in solution. A highly selective bromination of aliphatic carbon-carbon double bonds is achieved, leaving the aromatic rings essentially unaffected. The process is preferably run in a chlorinated solvent that does not contain oxygen. This helps to minimize the formation of ether groups on the polymer, which is beneficial because the ether groups often adversely affect the thermal stability of the brominated polymer. Another advantage is that surprisingly little halogen exchange occurs between the brominated polymer and the chlorinated solvent, if temperature conditions are controlled to below about 80° C. As a result, the brominated butadiene polymer tends to have good thermal characteristics and can be used, for example, as a flame retardant additive for thermoplastic polymers such as polystyrene.

The process as described in WO 2008/021417 is more expensive than desired, as significant quantities of solvents and washing liquids are required. This leads to high capital costs for all of the handling equipment and high energy costs to remove solvents and washing fluids from the various process streams. Therefore, a more economical bromination process is desirable.

The present invention is in one aspect a process comprising a. contacting a starting butadiene polymer containing aliphatic carbon-carbon double bonds with a quaternary ammonium tribromide under conditions such that the starting butadiene polymer and the quaternary ammonium tribromide react to produce a brominated butadiene polymer and a quaternary ammonium monobromide byproduct, wherein the reaction of the starting butadiene polymer is conducted in the presence of a solvent in which the starting butadiene polymer and the quaternary ammonium tribromide are both soluble under the conditions of the reaction and in which the brominated butadiene polymer is at least partially soluble, and such that a solution or slurry of the brominated butadiene polymer in the solvent is formed in the reaction, b. extracting the solution or slurry of the brominated butadiene polymer with an aqueous phase containing a reducing agent to form an aqueous quaternary ammonium monobromide salt stream and a washed solution or slurry of the brominated butadiene polymer, c. contacting the aqueous quaternary ammonium monobromide salt stream obtained in step b with elemental bromine and a solvent stream to form an aqueous raffinate stream and a solution of the quaternary ammonium tribromide in the solvent, and d. recycling the quaternary ammonium tribromide solution obtained in step c into step a.

This process provides an efficient and economical way to recover quaternary ammonium monobromide byproducts and regenerate the quaternary ammonium tribromide starting material for re-use in the bromination process. The process takes advantage of the differing solubilities of the quaternary ammonium tribromide and monobromide salts to, firstly, facilitate the extraction of the quaternary ammonium monobromide salt species from the solvent phase to the aqueous phase and, secondly, facilitate the extraction of the quaternary ammonium tribromide species from the aqueous phase into fresh solvent phase for re-introduction into the bromination reaction step.

Preferred embodiments of the invention further comprise:

e. recovering the brominated butadiene polymer from the washed solution or slurry obtained in step b to produce a solid brominated butadiene polymer and a solvent stream, and f. recycling at least a portion of the solvent stream obtained in step e into step c. Step e preferably is conducted by e1) forming the washed solution or slurry into fine droplets, e2) thermally stripping the solvent from the droplets to form particles of the brominated butadiene polymer and, before or after the thermal stripping step, e3) washing the droplets or particles with water.

Other preferred embodiments of the invention further comprise:

g. after step e3), separating the particles of brominated butadiene polymer from the wash water and recycling at least a portion of the wash water into at least one of step a, step b or step e.

In the FIGURE, butadiene polymer is fed from holding tank V1 through line 10 to dissolution vessel V2. Line 10 may include some feeding means for transferring the solid butadiene polymer from vessel V1 into dissolution vessel V2. The solid butadiene polymer is suitably in the form of a particulate to facilitate feeding. The feeding means can be a conveyer belt, a screw feeder, or any other suitable device.

Solvent is fed into dissolution vessel V2 from line 11a, and the butadiene polymer is dissolved in the solvent in dissolution vessel V2 to produce a butadiene polymer solution. As will be explained in more detail below, the solvent fed from line 11a is a recycle solvent stream in the embodiment shown. Alternatively, fresh solvent can be used to produce the butadiene polymer solution, or some combination of fresh solvent and recycled solvent can be used.

The butadiene polymer solution is transferred to reactor V3 through line 12. A solution of a quaternary ammonium tribromide is introduced into reactor V3 through line 18. The butadiene polymer and the quaternary ammonium tribromide react in reactor V3 to produce a brominated butadiene polymer. In the context of this invention, "bromination" refers to the addition of two bromine atoms across a carbon-carbon double bond, such that each of the carbon atoms becomes bonded to a bromine atom. At least a portion of the quaternary ammonium tribromide is converted to a quaternary ammonium monobromide by-product.

Suitable conditions for the bromination reaction are described in WO 2008/021417. In general, about 0.5 to about 5 moles of the quaternary ammonium tribromide are used per mole of butadiene units in the butadiene polymer. A more suitable amount is from about 0.9 to about 2.5 moles/mole and an even more suitable amount is from 1 to 1.5 moles/mole. Generally, only mild conditions are needed to effect the bromination. Bromination temperatures can range from −20 to 100° C., and are preferably from 0 to 90° C. and especially from 40 to 80° C. Temperatures higher than 100° C. could be used, but are not necessary and may lead to a loss of selectivity and/or an increase in by-products. Superatmospheric pressures are generally not needed unless the reaction temperature is at or above the boiling temperature of the solvent, in which case superatmospheric pressures can be used as necessary to prevent the solvent from boiling.

If desired, the reaction can be followed analytically to monitor the conversion of the aliphatic carbon-carbon double bonds. The extent of bromination can be determined using proton NMR methods. Residual aliphatic carbon-carbon double bonds can be determined by comparing integrated areas of signals due to residual double bond protons (between 4.8 and 6 ppm relative to tetramethylsilane (TMS)), and protons for brominated polybutadiene (signals for which are between 3.0 and 4.8 ppm). A Varian INOVA™ 300 NMR spectrometer or equivalent device is useful for such determinations, suitably being operated with a delay time of 30 seconds to maximize relaxation of protons for quantitative integrations. A deutero-substituted solvent such as deuterochloroform or d5-pyridine is suitable for diluting the sample for NMR analysis.

Under the conditions described above, the bromination reaction tends to be highly selective in several respects. Little or no bromination occurs on the aromatic rings. Otherwise, bromination tends to take place at the carbon-carbon double bonds of both 1,2- and 1,4-butadiene units, and bromination tends to take place so that little bromination occurs at tertiary carbon atoms. It is believed that the bromination occurs through an ionic mechanism, rather than a free radical mechanism that tends to introduce unwanted bromine at tertiary carbon atoms. Tertiary bromines are believed to adversely affect the temperature stability of the brominated copolymer. Hydrobromination, or the addition of HBr across a carbon-carbon double bond, has been found to be minimal using this process.

Reactor V3 can be either a continuous or batch reactor. Continuous reactors are generally preferred when reaction kinetics are fast because they are smaller and thus less costly. Surge vessels between unit operations are generally smaller as well. If desired, multiple reactors V3 can be used in parallel or in series, instead of the single reactor shown in the FIGURE.

The reaction that occurs in reactor V3 produces a mixture of brominated butadiene polymer, solvent and quaternary ammonium monobromide salt. Some residual quaternary ammonium tribromide may be present. An aqueous phase may be present in some embodiments of the invention. The mixture may contain small quantities of other materials. The brominated butadiene polymer will be partially or entirely dissolved in the solvent. The quaternary ammonium monobromide salt has little solubility in the solvent, and so tends to precipitate from the reaction mixture, unless an aqueous phase is present. Therefore, the reaction mixture produced in reactor V3 is usually in the form of a slurry, with quaternary ammonium monobromide salt and perhaps some of the brominated butadiene polymer being suspended in the solvent. If an aqueous phase is present, the quaternary ammonium monobromide salt may be dissolved in the aqueous phase, in which case the reaction mixture is a two-phase system which may contain, in addition to the organic and aqueous phases, some undissolved quaternary ammonium monobromide salt and/or undissolved brominated butadiene polymer.

The reaction mixture is transferred to first extraction column V5 (as shown, via line 13). One or more pumps or other apparatus for effecting the transfer (not shown) can be used. If reactor V3 is a batch reactor, one or more holding tanks can be interposed between reactor V3 and first extraction column V5. First extraction column V5 is most conveniently operated in a continuous manner. One or more holding tanks facilitate the transition from an upstream batch process to a continuous process starting at first extraction column V5.

The solution or slurry of the brominated butadiene polymer is extracted in first extraction column V5 with an aqueous phase that contains a reducing agent. In the embodiment shown, water is introduced into first extraction column V5 in two places. A solution of water and reducing agent is introduced via line 14. In addition, a second stream of water is introduced via line 15a. This arrangement allows for good control of the rate of reducing agent addition, and allows one to handle a smaller volume reducing agent stream. This arrangement also allows the reducing agent to contact the butadiene polymer solution or slurry and reduce residual quaternary ammonium tribromide to the monobromide salt before the solution or slurry is contacted with the bulk of the water stream. This is believed to facilitate the extraction of the quaternary ammonium compounds into the aqueous phase and thus produce an extracted polymer solution with fewer ionic impurities. Alternatively, it is within the scope of the invention to introduce all of the water and reducing agent into first extraction vessel V5 in a single stream.

As shown, first extraction vessel V5 is operated countercurrently. The arrangement illustrated assumes that the solvent will be denser than the water. In such a case, the butadiene polymer solution is introduced from line 13 near the top of first extraction column V5 and travels downward through the column. Water and the reducing agent are introduced lower in first extraction column V5, and travel upward through the column.

Quaternary ammonium monobromide salts are transferred into the aqueous phase in first extraction column V5, and in that manner are removed from the solution or slurry of the brominated butadiene polymer. As mentioned, the reducing agent converts any residual quaternary ammonium tribromides, which are soluble in the solvent, to the corresponding monobromide salts, which are less soluble in the solvent but more soluble in the aqueous phase. This increases the efficiency of the extraction, ensuring high recovery of the valuable quaternary ammonium monobromide salt.

An aqueous quaternary ammonium monobromide solution is withdrawn from near the top of first extraction column V5 and transferred via line 16 to second extraction column V4. In the embodiment shown, additional wash water, which may be recycled from another portion of the process, is introduced into second extraction column V4 via line 17. Line 17 can, for example, divert a portion of the recycle stream from line 15 into second extraction column V4. It is also within the scope of the invention to omit the additional wash water altogether.

The aqueous quaternary ammonium monobromide solution is contacted with bromine and the solvent in second extraction column V4. In the embodiment shown, second extraction column V4 is operated countercurrently, and again assumes that the solvent is denser than water. Therefore, the quaternary ammonium monobromide solution (and additional recycle water, if any) is introduced near the bottom of second extraction column V4. As shown, bromine is added through line 26. The bromine can be added as a solution in the solvent. Solvent is added near the top of extraction column V4, through line 11b. It is possible to add the bromine and solvent as a single stream. However, it is preferred to add the bromine separately from the bulk of the solvent, and to add the bromine below the solvent to reduce bromine losses in the aqueous raffinate. Fresh recycle solvent contacts the aqueous raffinate before that solution leaves second extraction column V4. Traces of entrained bromine in the aqueous raffinate are thus extracted into the fresh recycle solvent. Similarly, the additional wash water preferably is added to second extraction column V4 below the quaternary ammonium monobromide feed (as shown). This allows the wash water to extract traces of entrained quaternary ammonium monobromide salt from the quaternary ammonium tribromide solution. These separate water and solvent additions allow the monobromide salt, which partitions strongly into the aqueous phase, to be converted efficiently to the quaternary ammonium tribromide species, which in turn partitions strongly to the solvent phase.

Therefore, a solution of the quaternary ammonium tribromide is formed in second extraction column V4. This solution is recycled back into reactor V3 through line 18. If reactor V3 is a batch reactor, or if otherwise necessary, one or more holding tanks can be interposed within line 18 between second extraction column V4 and reactor V3. As before, holding tanks can facilitate a transition from the preferred continuous operation of second extraction column V4 and a batch operation in reactor V3.

The extractions and reactions in the first extraction column V5 and second extraction column V4 can be performed in an agitated batch mixing vessel if desired or necessary, but this generally requires larger more expensive equipment and intermediate storage vessels. It is preferred to perform these extractions in continuous devices, and more preferably in multistage devices. Often multistage columns or differential contactor columns are preferred for economic reasons.

A washed solution or slurry of the butadiene polymer is formed in first extraction column V5. The brominated butadiene polymer is recovered from that washed solution or slurry, to produce a solid brominated butadiene product and a solvent stream. All or a portion of the solvent stream can be recycled back into the process. It is preferred to recycle at least a portion of the solvent stream back into step c of the process. A portion of the solvent stream may be reused to dissolve the butadiene polymer at the start of the process, becoming recycled in that manner as well.

As shown in the FIGURE, the solution or slurry of the brominated butadiene polymer is withdrawn from first extraction column V5 through line 27, and transferred to recovery vessel V8. The brominated butadiene polymer is separated from the solvent in recovery vessel V8, producing a brominated butadiene polymer stream 24 and a mixed vapor stream 22.

Various approaches to recovering the brominated butadiene polymer can be used, and the design and operation of recovery vessel V8 will of course reflect the particular approach that is chosen. The solvent can be evaporated from the solution or slurry. Alternatively, the brominated butadiene polymer can be precipitated from the solution or slurry by addition of an antisolvent.

In a preferred embodiment, the washed solution or slurry entering recovery vessel V8 is formed into fine droplets. The solvent is thermally stripped from the droplets to form particles of the brominated butadiene polymer. Before or after the thermal stripping step, the droplets or particles are washed with water. This produces a wet, particulate brominated butadiene stream which can be filtered and/or dried to recover the product.

In the embodiment shown in the FIGURE, the brominated butadiene solution or slurry exiting first extraction vessel V5 is transferred via line 27 and sprayed into recovery vessel V8. Recovery vessel V8 is partially filled with water. As shown, the solution or slurry is sprayed into the head space of recovery vessel V8 to form droplets, which fall into the water in recovery vessel V8. The solvent can be thermally stripped from the droplets while they are falling, before they reach the level of the water. Alternatively, the solvent can be stripped from the droplets after they have fallen into the water and become dispersed there. It is possible to remove part of the solvent before the droplets reach the water and the rest of the solvent once the droplets have become dispersed in the water. The water phase is preferably agitated in some manner to keep the droplets dispersed until the solvent is removed and the brominated polymer has precipitated to form solid particles.

A source of heat is provided within recovery vessel V8 in order to strip the solvent from the droplets. A preferred heat source is directly injected steam. In the embodiment shown in the FIGURE, steam is introduced into recovery vessel V8 in two places, though line 23 and line 30. Line 23 introduces steam very close to the point at which the brominated butadiene polymer droplets are introduced, which is preferred. An especially preferred apparatus for introducing the steam in this manner is a two-fluid nozzle which atomizes the brominated butadiene solution or slurry into droplets and introduces the steam and the droplets together into recovery vessel V8. A portion of the steam in Line 23 may bypass the two-fluid nozzle and be added very close to the two-fluid nozzle at a low velocity relative to the spray from the two-fluid nozzle, to provide additional thermal energy without adding atomizing energy. Line 30 introduces steam below the surface of the fluid in recovery vessel V8. In the preferred embodiment, the steam flowrate introduced through line 23 is larger than the steam flowrate introduced through line 30. In an alternative embodiment, all the steam can be introduced via line 30.

In another alternative embodiment, the droplets and preferably steam as well are introduced below the surface of the water in recovery vessel V8. Again, a two-fluid nozzle can be used to introduce the materials.

A mixed vapor stream 22 containing steam as well as solvent vapor exits recovery vessel V8. Solvent that is contained in mixed vapor stream 22 preferably is recycled back into the process as mentioned before. Mixed vapor stream 22 may contain entrained tiny polymer particles, which should be removed from the stream and preferably recovered. As shown in the FIGURE, mixed vapor stream 22 is transferred to particle scrubber V9, where tiny polymer particles are scrubbed out with hot water that suitably is recirculated internally in the scrubber. The scrubber water should be hot enough to prevent condensation of either steam or solvent. A preferred way to heat the scrubber water is with directly injected steam, which can be injected at any convenient location. To prevent accumulation of solids in the circulating scrubber water, a portion of the circulating scrubber water (containing polymer particles) is removed from particle scrubber V9 through line 28. To prevent depletion of the circulating scrubber water, additional water is introduced into particle scrubber V9 through line 35. The volume of water added to particle scrubber V9 through line 35 should be approximately equal to the amount of water that is removed though line 28. Water introduced through line 35 preferably is recycled from another part of the process. As shown, the water is recycled wash water from polymer recovery unit V10. The scrubbed vapor is then transferred via line 29 to condenser vessel V6. As shown, the water (with entrained brominated polymer particles) withdrawn from particle scrubber V9 via line 28 is recycled through line 36 back into recovery vessel V8.

Solvent and steam are condensed in condenser vessel V6, and the resulting water/solvent mixture is transferred via line 20 to separator V7, where the water and solvent are permitted to phase separate. Separator V7 can be a decanter or other apparatus for separating liquid phases. The solvent phase is then recycled through line 11. As shown, a portion of the recycled solvent is recycled back to second extraction column V4 via line 11b, and another portion of the recycled solvent is recycled back to dissolution vessel V2 via line 11a. It is preferred that at least a portion of the recycled solvent is recycled back to second extraction column V4. The water phase is recycled to recovery vessel V8 through lines 21 and 36. For convenience, the recycled water phase in lines 21 and 36 may be mixed with the dilute water slurry in line 28 before entering recovery vessel V8.

The aqueous raffinate stream produced in second extraction column V4 contains ionic impurities, the nature of which depends on the particular reducing agent and buffering agent introduced in stream 14. If sodium thiosulfate and sodium hydroxide are used, the byproducts will be sodium bromide and sodium sulfate. It is preferred to remove any residual solvent from the aqueous raffinate stream before processing it further for recovery of the bromide or disposal.

In the embodiment shown in the FIGURE, the aqueous raffinate stream is withdrawn from second extraction column V4 through line 19 and stripped in stripper column V11 to remove residual solvent. A preferred stripping method is steam stripping. As shown, steam is supplied to stripper column V11 via line 32. The vapors from stripper column V11 preferably are condensed, recovered and recycled. In the embodiment shown, the vapors from stripper column V11 are sent to condenser V6 through line 34. If desired, the contents of lines 34 and 29 can be combined before being introduced into condenser V6. It is also possible to use separate condensation apparatus for each of lines 34 and 29. Similarly, a single decanter V7 can be used to separate the resulting liquid phases recovered from lines 34 and 29 (as shown), or separate decanters can be provided. A waste stream 33, which contains ionic impurities, is withdrawn from stripper column V11 and removed from the process.

Water is removed from recovery vessel V8, as a slurry with the brominated butadiene polymer particles, through line 24. The water and brominated butadiene polymer particles are separated in polymer recovery unit V10. Polymer recovery unit V10 includes any suitable liquid-solid separation device. The liquid-solid separation device can be a mechanical device such as a filter, vacuum filter, centrifuge and the like, or can be a thermal device such as a dryer. Usually, a mechanical liquid-solid separation device will be used to remove most of the water, followed by a drying step. Centrifuging, followed by a drying step, is a preferred way to remove water from the slurry. A centrifuge that is capable of continuous operation, such as a pusher centrifuge, is especially useful.

It has been found that centrifugal filtration often removes water from the brominated butadiene polymer particles more efficiently than does hydraulic pressure filtration. This may be because the particles tend to be in the form of lightly agglomerated primary particles which can absorb water through surface tension effects. Applying centrifugal force with provision for liquid drainage can rapidly reduce the amount of water retained by the brominated butadiene polymer particles from 3 or more grams of water per gram of polymer particles (as is often achieved using filtration methods) into a range of from about 1 to 2 grams of water per gram of polymer particles. This reduces the amount of water that must be removed in the subsequent drying step, and for that reason equipment and operating costs associated with the dryer can be reduced. Another benefit is that less residual solvent is lost with the hot gas stream exiting the dryer.

Most of the water recovered from polymer recovery unit V10 may be recycled directly to recovery vessel V8 through line 15b. Additional water may be added into polymer recovery unit V10 through line 31 to wash impurities from the solid polymer particles. If the amount of recycle water needed for first extraction column V5 (via line 15a), second extraction column V4 (via line 17) and bromination reactor V3 exceeds the amount of available recycle water, fresh water may be added directly to supplement or replace the recycle water. The recovered brominated butadiene polymer is removed from polymer recovery unit V10 (such as through line 25), from which it can be further processed by, for example, drying, compacting and packaging. Drying further reduces the water content of the brominated butadiene polymer particles. Compacting increases the bulk density of the particles, which reduces their volume. Compacting is preferred when the product is to be packaged and transported, as the lower volume reduces packaging and shipping expenses. Compacting is conveniently performed using a roller compactor or similar apparatus. Compaction is generally followed by a flaking and/or granulation step to reduce the compacted material to pellets or particles.

The FIGURE is intended only as a schematic representation of an embodiment of the process. It includes various preferred or optional features. The FIGURE is not intended to show specific engineering features or details, including the design of the various components shown. In addition, auxiliary equipment such as various valves, pumps, heating and cooling equipment, analytical and/or control devices and the like are not shown, but of course can be used as necessary or desirable.

The process may include features in addition to those described before or shown in the FIGURE. For example, the process may include means for taking various purge streams as a way to remove accumulating impurities from the process. Fresh reagent or solvent may be added to replenish the amounts purged from the system.

In an alternative embodiment of the invention, water is introduced into reactor V3 after the bromination reaction has reached at least 25% conversion, but before the reaction has reached 90% conversion. The remainder of the reaction is then conducted in the presence of the water. It is preferred to add the water after the conversion has reached at least 50%, more preferably at least 60%, but before the conversion has reached 80%. In these alternative embodiments, enough water should be added to dissolve at least 50%, more preferably at least 75% and even more preferably at least 90%, of the quaternary ammonium monobromide salt that is formed in the bromination reaction. By "conversion", it is meant the percentage of aliphatic carbon-carbon double bonds in the starting butadiene polymer that have been brominated by addition of two bromine atoms across the double bond. The addition of water in this manner has been found to greatly accelerate the reaction rate while producing a brominated polymer having very desirable thermal properties.

Figure 1:
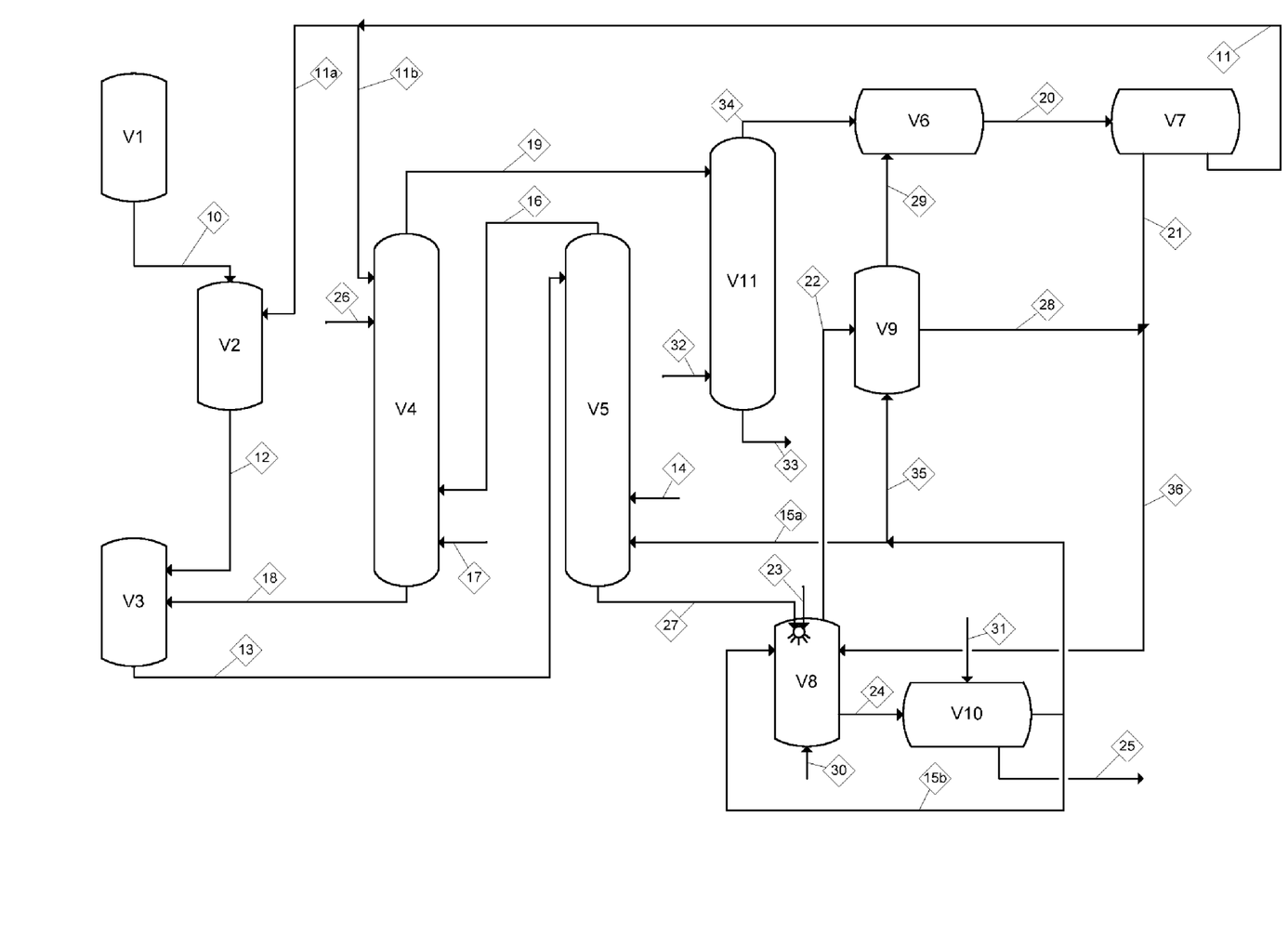
The FIGURE is a schematic diagram of an embodiment of the process of the invention.

Water recycled from any suitable point in the process can be introduced into step a of the process, i.e., into reactor V3 in FIG. 1. For example, a portion of the water from lines 15a or 15b can be introduced in reactor V3. If reactor V3 is a continuous reactor, the water is added at a location within the reactor at which the butadiene polymer is at the desired conversion. If reactor V3 is a batch reactor, the water is added at the time at which the butadiene is at the desired conversion. The water can be removed together with the remainder of the reaction mixture and taken through to step b in the process, i.e., removed from reactor V3 through line 13 and transferred to first extraction column V5. The water will then form part of the aqueous quaternary ammonium monobromide salt stream that is formed in step b.

Another optional but preferred step of the process is the introduction of various additives to the brominated butadiene polymer during the process. A convenient place to add the additives is into the washed brominated butadiene polymer solution or slurry that is obtained after step b of the process, i.e., the material withdrawn from first extraction vessel V5 via line 27 in the FIGURE. Additives that are liquids or are soluble in the solvent are readily added to the brominated butadiene polymer at this point in the process. A blending vessel can be interposed in line 27 for introducing the additive or additives.

A polymer of butadiene is the starting material in this process. The butadiene polymer may be a homopolymer, or a copolymer of butadiene and one or more other monomers. A copolymer may be a random, block or graft copolymer, and should contain at least 10% by weight of polymerized polybutadiene. Butadiene polymerizes to form two types of repeating units. One type, referred to herein as "1,2-butadiene units" takes the form and so introduce pendant unsaturated groups to the polymer. The second type, referred to herein as "1,4-butadiene" units, takes the form —$CH_2$—CH=CH—$CH_2$—, introducing unsaturation into the main polymer chain. The butadiene polymer should contain at least some 1,2-butadiene units. Of the butadiene units in the butadiene polymer, suitably at least 10%, preferably at least 15% and more preferably at least 20% and even more preferably at least 25% are 1,2-butadiene units. 1,2-butadiene units may constitute at least 50%, at least 55%, at least 60% or at least 70% of the butadiene units in the butadiene polymer. The proportion of 1,2-butadiene units may be in excess of 85% or even in excess of 90% of the butadiene units in the polymer.

Methods for preparing butadiene polymers with controlled 1,2-butadiene content are described by J. F. Henderson and M. Szwarc in *Journal of Polymer Science* (D, Macromolecular Review), Volume 3, page 317 (1968), Y. Tanaka, Y. Takeuchi, M. Kobayashi and H. Tadokoro in *J. Polym. Sci.* A-2, 9, 43-57 (1971), J. Zymona, E. Santte and H. Harwood in *Macromolecules*, 6, 129-133 (1973), and H. Ashitaka, et al., in *J. Polym. Sci., Polym. Chem.*, 21, 1853-1860 (1983).

A preferred starting material is a random, block or graft copolymer of butadiene and at least one vinyl aromatic monomer. A "vinyl aromatic" monomer is an aromatic compound having a polymerizable ethylenically unsaturated group bonded directly to a carbon atom of an aromatic ring. Vinyl aromatic monomers include unsubstituted materials such as styrene and vinyl naphthalene, as well as compounds that are substituted on the ethylenically unsaturated group (such as alpha-methylstyrene, for example), and/or are ring-substituted. Ring-substituted vinyl aromatic monomers include those having halogen, alkoxyl, nitro or unsubstituted or substituted alkyl groups bonded directly to a carbon atom of an aromatic ring. Examples of such ring-substituted vinyl aromatic monomers include 2- or 4-bromostyrene, 2- or 4-chlorostyrene, 2- or 4-methoxystyrene, 2- or 4-nitrostyrene, 2- or 4-methylstyrene and 2,4-dimethylstyrene. Preferred vinyl aromatic monomers are styrene, alpha-methyl styrene, para-methyl styrene, and mixtures thereof.

"Vinyl aromatic units" are repeating units in the starting material that are formed when a vinyl aromatic monomer is polymerized. A suitable butadiene/vinyl aromatic starting copolymer contains from 5 to 90 percent by weight of polymerized vinyl aromatic monomer units and at least 10% by weight of polymerized butadiene.

A butadiene/vinyl aromatic copolymer may be a random, block (including multiblock such as diblock or triblock types) or graft type of copolymer. Styrene/butadiene block copolymers are widely available in commercial quantities. Those available from Dexco Polymers under the trade designation VECTOR™ are suitable. Styrene/butadiene random copolymers may be prepared in accordance with the processes described by A. F. Halasa in *Polymer*, Volume 46, page 4166 (2005). Styrene/butadiene graft copolymers may be prepared in accordance with methods described by A. F. Halasa in *Journal of Polymer Science* (Polymer Chemistry Edition), Volume 14, page 497 (1976). Styrene/butadiene random and graft copolymers may also be prepared in accordance with methods described by Hsieh and Quirk in chapter 9 of *Anionic Polymerization Principles and Practical Applications*, Marcel Dekker, Inc., New York, 1996.

The butadiene polymer may also contain repeating units formed by polymerizing monomers other than butadiene and a vinyl aromatic monomer. Such other monomers include olefins such as ethylene and propylene, acrylate or acrylic monomers such as methyl methacrylate, methyl acrylate, acrylic acid, and the like. These monomers may be randomly polymerized with the butadiene, may be polymerized to form blocks, or may be grafted onto the butadiene polymer.

The most preferred type of butadiene polymer is a block copolymer containing one or more polystyrene blocks and one or more polybutadiene blocks. Among these, block copolymers having a central polybutadiene block and terminal polystyrene blocks are especially preferred.

The butadiene polymer has a weight average molecular weight ($M_w$) within a range of from 1,000 to 400,000, preferably from 2,000 to 300,000, more preferably from 5,000 to 200,000 and even more preferably from 50,000 to 175,000. For purposes of this invention, molecular weights are apparent molecular weights as measured by Gel Permeation Chromatography (GPC), relative to a polystyrene standard. GPC molecular weight determinations can be performed using an Agilent 1100 series liquid chromatograph equipped with two Polymer Laboratories PLgel 5 micrometer Mixed-C columns connected in series and an Agilent G1362A refractive index detector, with tetrahydrofuran (THF) flowing at a rate of 1 mL/min and heated to a temperature of 35° C. as the eluent.

The brominating agent used in this invention is a quaternary ammonium tribromide. The tribromide is suitably selected from one or more of a phenyltrialkylammonium tribromide, benzyltrialkylammonium tribromide or a tetraalkylammonium tribromide. Examples of these include phenyltrimethylammonium tribromide, benzyltrimethylammonium tribromide, tetramethylammonium tribromide, tetraethylammonium tribromide, tetrapropylammonium tribromide, tetra-n-butylammonium tribromide and the like.

There are several requirements for the solvent. It is a liquid under the conditions of the bromination reaction. The starting butadiene polymer and the quaternary ammonium tribromide must be soluble in the solvent. The brominated butadiene polymer preferably is soluble in the solvent.

It is desirable that the quaternary ammonium monobromide salt by-product should be substantially insoluble in the solvent. Solvent extraction is still possible if the quaternary ammonium monobromide salt is partially soluble in the solvent. The equilibrium distribution coefficient $K_D$ for the extraction of monobromide from solvent into water is the ratio of the quaternary ammonium monobromide salt concentration in the water phase divided by its concentration in the solvent phase. The extraction factor E is calculated by multiplying $K_D$ by the solvent-to-feed ratio. For the extraction of monobromide salt into water, the solvent phase is considered the "feed" phase and the water is considered the "solvent" phase. For high recovery via solvent extraction to be possible, the value of E must be greater than one. To minimize capital cost of extraction equipment, the value of E should be greater than 1.3 and preferably greater than 2. However, values of E greater than 10 are not effective in further reducing capital cost.

The value of E can be increased by increasing the $K_D$ or by increasing the water-to-feed ratio for the extraction of monombromide salt from solvent into water. The value of $K_D$ depends on the particular combination of quaternary ammonium monobromide salt and solvent used. It is preferable to have a $K_D$ much greater than one, which is the case when the monobromide salt is substantially insoluble in the solvent phase. However, since the E is also affected by the phase ratio, a larger phase ratio can be used to compensate for a lower $K_D$. Higher $K_D$ are preferred because lower phase ratios can then be used, and lower phase ratios result in smaller and less costly equipment.

Similarly, the extraction of quaternary ammonium tribromide from water into solvent is controlled by the E for that extraction, which depends on its distribution coefficient $K_D$ and its solvent-to-feed ratio. For this extraction, the water phase is the "feed" phase and the solvent/bromine phase is the "solvent" phase. As before, a high value of $K_D$ is desirable because it allows use of a smaller solvent-to-feed ratio and thus smaller, less expensive equipment, but systems with lower values of $K_D$ can be used with the correct solvent-to-feed ratio.

For this process, the two extraction steps are interrelated: the "solvent" phase of the monobromide extraction is aqueous and the extract becomes the "feed" phase of tribromide extraction. The phase ratios of the two extractions are coupled as well as the distribution coefficients.

It is preferable that the solvent be substantially immiscible in water. The density of the solvent is different than that of water, preferably higher than that of water, so that the solvent will readily separate from water under somewhat quiescent conditions to form separate phases. A density difference also promotes the countercurrent operation during steps b and c. The solvent density is preferably at least 1.05, more preferably at least 1.10, g/cc. In addition, the solvent should not react with the starting butadiene polymer, the brominated butadiene polymer or the quaternary ammonium tribromide.

To improve extraction efficiency, it is advantageous to use extraction devices that have multiple countercurrent contacting stages. Mixer-settler systems are one such system and can be used at large phase ratios. A second approach is to use a device with an extended differential contacting zone. A rotating disk extraction column or a Karr reciprocating plate extraction column are two such devices. Where there is only a small density difference between the phases, centrifugal extraction devices like the Podbielniak contactor or the Robatel contactor can be useful.

Examples of suitable solvents include ethers such as tetrahydrofuran; halogenated alkanes such as carbon tetrachloride, chloroform, dichloromethane, bromochloromethane ($CH_2BrCl$), dibromomethane and 1,2-dichloroethane; hydrocarbons such as cyclohexane and toluene; and halogenated aromatic compounds such as bromobenzene, chlorobenzene and dichlorobenzene. The solvent is preferably aprotic and is not oxygenated, as oxygen-containing solvents can engage in addition reactions across the aliphatic double bonds of the butadiene/vinyl aromatic copolymer, leading to a deterioration of the thermal properties of the product. Halogenated and hydrocarbon solvents are therefore preferred as the solvent over oxygen-containing solvents. It has been found that halogen exchange reactions do not occur to a significant extent when mild reaction conditions are used, and for that reason chlorinated solvents are very suitable for use in the invention.

The solvent may be a mixture of solvents, such as a halogenated solvent with of a small amount of hydrocarbon solvent.

The solvent is used in quantities sufficient to dissolve the butadiene polymer under the conditions of the bromination reaction in step a. The concentration of the butadiene polymer in the solvent may range from, for example, 1 to 50% by weight, especially from 5 to 35% by weight.

The reducing agent is any material that is soluble in water and which reduces quaternary ammonium tribromide to the corresponding quaternary ammonium monobromide salt. Sodium thiosulfate ($Na_2S_2O_3$) is a suitable reducing agent. Additional bases or salts such as sodium hydroxide and sodium carbonate may be present to adjust the pH or otherwise buffer the aqueous stream carrying the reducing agent.

The process of the invention tends to produce brominated copolymer products that have excellent thermal stability. A useful indicator of thermal stability is a 5% weight loss temperature, which is measured by thermogravimetric analysis as follows: 10 milligrams of the polymer is analyzed using a TA Instruments model Hi-Res TGA 2950 or equivalent device, with a 60 milliliters per minute (mL/min) flow of gaseous nitrogen and a heating rate of 10° C./min over a range of from room temperature (nominally 25° C.) to 600° C. The mass lost by the sample is monitored during the heating step, and the temperature at which the sample has lost 5% of its initial weight (after loss of residual solvent and other volatiles that the sample may contain) is designated the 5% weight loss temperature (5% WLT). This method provides a temperature at which a sample has undergone a cumulative weight loss of 5 wt %, based on initial sample weight. The brominated copolymer preferably exhibits a 5% WLT of at least 200° C. The 5% WLT is preferably at least 220° C., more preferably at least 230° C., even more preferably at least 240° C., and still more preferably at least 250° C. Brominated copolymers in which at least 85% of the butadiene units have been brominated, and which have such 5% WLT values, are of particular interest.

A further increase in thermal stability is sometimes seen if the brominated butadiene polymer is treated with an alkali metal base. The alkali metal base may be, for example, a hydroxide or a carbonate. The alkali metal base is preferably an alkali metal alkoxide, as the alkali metal alkoxides tend to provide more of an increase in thermal stability than do some other bases, such as alkali metal hydroxides, carbonates or carboxylates. The alkali metal can be lithium, sodium, potassium or cesium. Lithium, sodium and potassium are preferred. The base is an alkali metal alkoxide in preferred embodiments. The alkoxide ion can contain from 1 to 8, preferably from 1 to 4, carbon atoms, with methoxide and ethoxide being especially preferred. Especially preferred alkali metal alkoxides are lithium methoxide, sodium methoxide, potassium methoxide, lithium ethoxide, sodium ethoxide and potassium ethoxide. The brominated butadiene polymer can be treated with as little as 0.01 mole of the alkali metal base per mole of polymerized butadiene units in the copolymer (whether brominated or unbrominated). There is no upper limit on the amount of alkali metal base, although cost and handling considerations mitigate against using more than about 1 mole of the alkali metal base per mole of polymerized (brominated or unbrominated) butadiene units in the copolymer. A preferred amount is from 0.03 to 0.50 moles/mole of polymerized (brominated or unbrominated) butadiene units, and an especially preferred amount is from 0.05 to 0.20 moles/mole.

The brominated butadiene polymer is useful as a flame retardant additive for a variety of organic polymers. Organic polymers of interest include vinyl aromatic or alkenyl aromatic polymers (including alkenyl aromatic homopolymers, alkenyl aromatic copolymers, or blends of one or more alkenyl aromatic homopolymers and/or alkenyl aromatic copolymers), as well as other organic polymers in which the brominated copolymer is soluble or can be dispersed to form domains of less than 30 μm, preferably less than 15 μm, in size. Enough of the brominated butadiene polymer is preferably present in the blend to provide the blend with a bromine content within a range of from 0.1 percent by weight to 25 percent by weight, based upon blend weight.

Blends of the brominated butadiene polymer may include other additives such as additional flame retardant additives, flame retardant synergists, thermal stabilizers, ultraviolet light stabilizers, plasticizers, dispersion aids, cell size enlargers, antioxidants, foaming agents, acid scavengers, compatibilizers and coloring agents.

As mentioned before, these additives can be in some cases added to the solution or slurry of the brominated butadiene polymer that is obtained from step b of the process, before the brominated butadiene polymer is isolated from the solvent. Surprisingly, incorporating additives at this point in the process sometimes provides a benefit when the brominated butadiene particles are recovered. When additives such as epoxide-containing acid-scavengers or antioxidants are added at this stage, the resulting blended butadiene polymer often can be more completely dewatered during a mechanical dewatering step such as centrifugation. This reduces the energy requirements of a subsequent drying step. An additional benefit occurs with the incorporation of an acid scavenger such as an epoxy additive resulting in a brominated polybutadiene with higher thermal stability. The isolated brominated polybutadiene polymer containing the epoxy acid scavenger will have a lower free bromide content than without the epoxy acid scavenger present. The free bromide value is indicative of the level of HBr that is present in the brominated polybutadiene polymer and HBr is known to reduce the thermal stability of the brominated polybutadiene.

An unexpected benefit of adding certain additives to the brominated butadiene polymer solution that is obtained from step b of the process is when the brominated butadiene polymer is recovered from the solution, it often disperses more easily into another organic polymer to form a blend. This is especially the case when the organic polymer is a styrenic polymer, particularly polystyrene. As a result of the improved dispersibility, the brominated butadiene polymer becomes dispersed more uniformly and forms smaller domains within the organic polymer. When such a blend is formed into an extruded foam, the foam tends to have somewhat larger average cell size, especially when the blowing agent includes or consists of carbon dioxide. Additives which have a plasticizing effect on either the polystyrene and/or brominated butadiene polymer in particular provide this improved dispersibility. Examples of such plasticizing additives include, for example, epoxidized fatty acids or vegetable oils, glycerine monostearate, tribromoneopentyl alcohol, mineral oils, dialkyl esters of aliphatic dicarboxylic acids such as nonyl diester of adipic acid (Hexamoll® DINCH, from BASF) and styrenic polymers such as poly(alphamethylstyrene) having weight average molecular weights less or equal to 40,000. In addition, additives which act as compatibilizers (typically various block copolymers) for the brominated butadiene polymer and the organic polymer can provide a similar effect.

Another convenient time to add the additives to the brominated butadiene polymer is after the particles have been at least partially dewatered, but before a compaction step. The additive or additives can be dry-blended with the partially or wholly dewatered polymer (if the additives are solids) or sprayed onto the polymer particles (if the additives are liquids). The blending can occur after a mechanical dewatering step (such as filtration or centrifugation) and before a drying step. Alternatively, the blending can occur after a drying step and before compaction. Preferably, the resulting blend is then compacted as described before to form a more densified material. This approach to incorporating additives has the benefits of low costs, and avoids thermal stresses that are seen in some alternative approaches, such as melt blending the additives into the brominated butadiene polymer. The presence of additives in some cases can benefit the roller compaction process itself, particularly when the additive includes a plasticizer. The roller pressure can often be reduced while still achieving the desired degree of compaction. Throughput increases as well, so smaller and/or fewer roller compactors are required at process scale, thus lowering processing costs.

The following examples are provided to illustrate the invention, but not to limit the scope thereof. All parts and percentages are by weight unless otherwise indicated.

EXAMPLE

A styrene-butadiene block copolymer containing 60% polymerized butadiene units is brominated in an apparatus as shown in the FIGURE. Line 10 includes a screw feeder. Dissolution vessel V2 is a stirred tank. Reactor V3 is a series of three jacketed stirred vessels (V3A,V3B, V3C). A surge tank is interposed on line 13 between reactor V3 and first extraction column V5. First extraction column V5 and second extraction column V4 are both countercurrent extraction columns. A surge tank is interposed in line 18 between second extraction column V4 and reactor V3. Condenser vessel V6 is water-cooled. Separator vessel V7 is a decanter. Scrubber V9 is a Venturi scrubber system with a steam input. Polymer recovery unit V10 includes a belt filter.

The starting copolymer is fed from holding tank V1 through line 10 into dissolution vessel V2 at a rate of about 36.3 kg/hr. Recycled methylene chloride solvent saturated with water enters dissolution vessel V2 through line 11a at a rate of about 363 kg/hr. A polybutadiene polymer solution is transferred from dissolution vessel V2 through line 12 to reactor V3A at the rate of about 400 kg/hr. A solution containing about 42% tetraethylammonium tribromide, 56% of methylene chloride and small quantities of water, bromine and impurities is fed into reactor V3A from second extraction column V4 through line 18, at a rate of about 350 kg/hr. About 86 kg/hr of water is added to reactor V3B. About 835 kg/hr of a crude reaction mixture is removed from reactor V3C. This crude reaction mixture contains about 9.6% of tetraethylammonium monobromide salt, 12% of brominated butadiene polymer, 66% methylene chloride, 11% water and small quantities of tetraethylammonium tribromide and other impurities.

The crude reaction mixture from reactor V3C is fed into the top portion of first extraction vessel V5. Recycled water is fed into the bottom of first extraction vessel V5 through line 15 at a rate of about 292 kg/hr. A stream of 36% sodium hydroxide, 14% sodium thiosulfate and 50% water is injected into first extraction vessel V5 through line 14 at a rate of about 5.8 kg/hr. First extraction vessel V5 is operated countercurrently to produce a washed solution of the brominated butadiene polymer, which is withdrawn via line 27 at a rate of about 652 kg/hr. An aqueous quaternary ammonium monobromide solution is formed in first extraction vessel V5. This solution is withdrawn from the top of the column through line 16 at the rate of about 481 kg/hr and transferred to second extraction vessel V4. An approximately 17 kg/hr makeup stream of 50% tetraethylammonium monobromide salt in water is added to stream 16 to compensate for losses in the second extractor V4.

Recycle water is introduced va line 17 near the bottom of second extraction vessel V4 at a rate of about 26 kg/hr. Liquid bromine in introduced via line 26 at a rate of about 67 kg/hr. Recycle solvent is introduced into second extraction vessel V4 through line 11b at a rate of about 228 kg/hr. An aqueous raffinate is withdrawn from the top of second extraction vessel V4 via line 19, at a rate of about 438 kg/hr. This stream contains a small amount of the solvent, 2-3% of tetraethylammonium monobromide salt and some other salts. The contents of line 19 are passed through stripper column V11 to produce a water/inorganic stream (line 33) that may be recycled to another process for inorganic recovery or disposed of in an environmentally accepted manner. An overhead stream 34 containing about 48% solvent and 52% water is then sent to condenser vessel V6.

The crude reaction mixture exiting first extraction vessel V5 is transferred to separation vessel V8 through line 27. It is injected together with steam through a two-fluid nozzle into the head space of separation vessel V8 to form droplets. The droplets fall into and are dispersed in the water residing in separation vessel V8 to form a slurry. Steam is added to the slurry through line 30 to strip additional solvent from the slurry. The slurry is removed from separation vessel V8 via line 24 and fed to polymer recovery unit V10, where the brominated butadiene polymer particles are separated from the water. The water recovered at polymer recovery unit V10 is recycled back into the process via lines 15a, 15b, 17 and 35.

Steam and the solvent which is thermally stripped from the butadiene droplets in separation vessel V8 are transferred through line 22 to scrubber V9, where the small polymer particles entrained in the vapor stream are scrubbed from the vapor with circulating hot water. Recycled hot water is added to scrubber V9 via line 35 and an equal volume of hot water containing fine polymer particles is removed from scrubber V9 via line 28. The solvent/steam vapor mixture is sent to condenser V6 via line 29, where it is combined with the overhead stream from stripping column V11 via line 34. The combined streams entering condenser vessel V6 are condensed and transferred to decanter V7. Water and solvent separate into two phases in decanter V7, with the water forming the lighter phase. Water saturated with solvent is withdrawn from decanter V7 through line 21, where it is combined with the water stream withdrawn from scrubber V9 via line 28 and sent to separation vessel V8, where it becomes part of the liquid phase residing in the tank. The solvent saturated with water in the lower layer in decanter V7 is then recycled back into the process via lines 11, 11a and 11b.

The brominated butadiene polymer from polymer recovery unit V10 is sent to further drying, milling and compacting operations. 100 kg/hr of brominated polymer are obtained. The bromine content of the product is 63.7%.

What is claimed is:

1. A process comprising
  a. contacting a starting butadiene polymer containing aliphatic carbon-carbon double bonds with a quaternary ammonium tribromide under conditions such that the starting butadiene polymer and the quaternary ammonium tribromide react to produce a brominated butadiene polymer and a quaternary ammonium monobromide byproduct, wherein the reaction of the starting butadiene polymer is conducted in the presence of a solvent in which the starting butadiene polymer and the quaternary ammonium tribromide are both soluble under the conditions of the reaction and in which the brominated butadiene polymer is at least partially soluble, and such that a solution or slurry of the brominated butadiene polymer in the solvent is formed in the reaction,
  b. extracting the solution or slurry of the brominated butadiene polymer with an aqueous phase containing a reducing agent to form an aqueous quaternary ammonium monobromide salt stream and a washed solution or slurry of the brominated butadiene polymer,
  c. contacting the aqueous quaternary ammonium monobromide salt stream obtained in step b with elemental bromine and a solvent stream to form an aqueous raffinate stream and a solution of the quaternary ammonium tribromide in the solvent, and
  d. recycling the quaternary ammonium tribromide solution obtained in step c into step a.

2. The process of claim 1, further comprising:
  e. recovering the brominated butadiene polymer from the washed solution or slurry obtained in step b to produce a solid brominated butadiene polymer and a solvent stream, and
  f. recycling at least a portion of the solvent stream obtained in step e into step c.

3. The process of claim 2, wherein step e is conducted by e1) forming the washed solution or slurry into fine droplets, e2) thermally stripping the solvent from the droplets to form particles of the brominated butadiene polymer and, before or after the thermal stripping step, e3) washing the droplets or particles in water.

4. The process of claim 3, further comprising:
  g. after step e3), separating the droplets or particles of brominated butadiene polymer from the wash water and recycling at least a portion of the wash water into at least one of step a, step b or step e.

5. The process of claim 4 wherein step g is conducted by centrifuging and drying the solid brominated butadiene polymer.

6. The process of claim 5 wherein at least one additive is added to the solid brominated butadiene polymer obtained in step e or in step g.

7. The process of claim 5 further comprising
  h. after step g, compacting the dried brominated butadiene polymer.

8. The process of claim 3, wherein in step e2), the droplets are steam stripped.

9. The process of claim 1, wherein at least one additive is added to the droplets or particles of the brominated butadiene polymer after step b.

10. The process of claim 4 wherein at least one additive is added to the washed solution or slurry of the brominated butadiene polymer obtained in step b.

11. The process of claim 10 wherein step g is conducted by centrifuging and drying the particles of brominated butadiene polymer and which further comprises
  h. after step g, compacting the dried brominated butadiene polymer.

12. The process of claim 1, wherein the solvent is one or more of carbon tetrachloride, chloroform, dichloromethane, bromochloromethane ($CH_2BrCl$), dibromomethane, 1,2-dichloroethane, cyclohexane, toluene, bromobenzene, chlorobenzene and dichlorobenzene.

13. The process of claim 1, wherein the quaternary ammonium tribromide is at least one of phenyltrimethylammonium tribromide, benzyltrimethylammonium tribromide, tetramethylammonium tribromide, tetraethylammonium tribromide, tetrapropylammonium tribromide and tetra-n-butylammonium tribromide.

14. The process of claim 1, wherein the starting butadiene polymer is a butadiene homopolymer or a random, block or graft copolymer of butadiene and at least one vinyl aromatic monomer.

15. The process of claim 1, wherein the starting butadiene polymer is a block copolymer of butadiene and styrene.

* * * * *